US008204188B2

(12) United States Patent
Lee

(10) Patent No.: US 8,204,188 B2
(45) Date of Patent: *Jun. 19, 2012

(54) CONTROL DEVICE FOR CONTROLLING SECURE FAX MACHINE AND METHOD THEREOF

(76) Inventor: Yun kyu Lee, Seongnam-si (KR)

( * ) Notice: Subject to any disclaimer, the term of this patent is extended or adjusted under 35 U.S.C. 154(b) by 610 days.

This patent is subject to a terminal disclaimer.

(21) Appl. No.: 12/159,690

(22) PCT Filed: Jun. 9, 2007

(86) PCT No.: PCT/KR2007/002450
§ 371 (c)(1),
(2), (4) Date: Jun. 8, 2009

(87) PCT Pub. No.: WO2007/142415
PCT Pub. Date: Dec. 13, 2007

(65) Prior Publication Data
US 2009/0304164 A1    Dec. 10, 2009

(30) Foreign Application Priority Data

Jun. 9, 2006 (KR) .................. 10-2006-0051996

(51) Int. Cl.
*H04M 11/00* (2006.01)
(52) U.S. Cl. ................... 379/100.05; 358/440
(58) Field of Classification Search .......... 358/440, 358/468, 1.14, 1.15, 400, 500, 444, 473, 358/442, 404, 405, 1.9, 434, 501; 379/100, 379/100.05
See application file for complete search history.

(56) References Cited

U.S. PATENT DOCUMENTS

| 6,298,122 | B1 | 10/2001 | Horne | |
|---|---|---|---|---|
| 6,721,059 | B1* | 4/2004 | Sturgeon et al. | 358/1.15 |
| 2004/0051910 | A1* | 3/2004 | Nakahara | 358/400 |
| 2004/0131164 | A1* | 7/2004 | Gould | 379/88.19 |
| 2005/0012966 | A1* | 1/2005 | Mitchell et al. | 358/440 |
| 2005/0182956 | A1* | 8/2005 | Ginter et al. | 713/193 |

FOREIGN PATENT DOCUMENTS

| EP | 0473162 | 4/1992 |
|---|---|---|
| JP | 09-261430 | 3/1996 |
| JP | 08-307626 | 11/1996 |
| JP | 11-088631 | 9/1997 |
| JP | 2001-119545 | 4/2001 |
| JP | 2003-186810 | 7/2003 |
| JP | 2007-324883 | 12/2007 |
| KR | 10-2003-0043454 | 2/2003 |

* cited by examiner

*Primary Examiner* — Curtis Kuntz
*Assistant Examiner* — Maria El-Zoobi
(74) *Attorney, Agent, or Firm* — Todd L. Juneau

(57) ABSTRACT

A facsimile controlling device for facsimile security can receive or block a fax transmitted from a registered fax number. In addition, the facsimile controlling device for facsimile security may allow a transmission document to undergo authentication before being transmitted to the outside or may block the transmission document from being transmitted to a registered number.

8 Claims, 5 Drawing Sheets

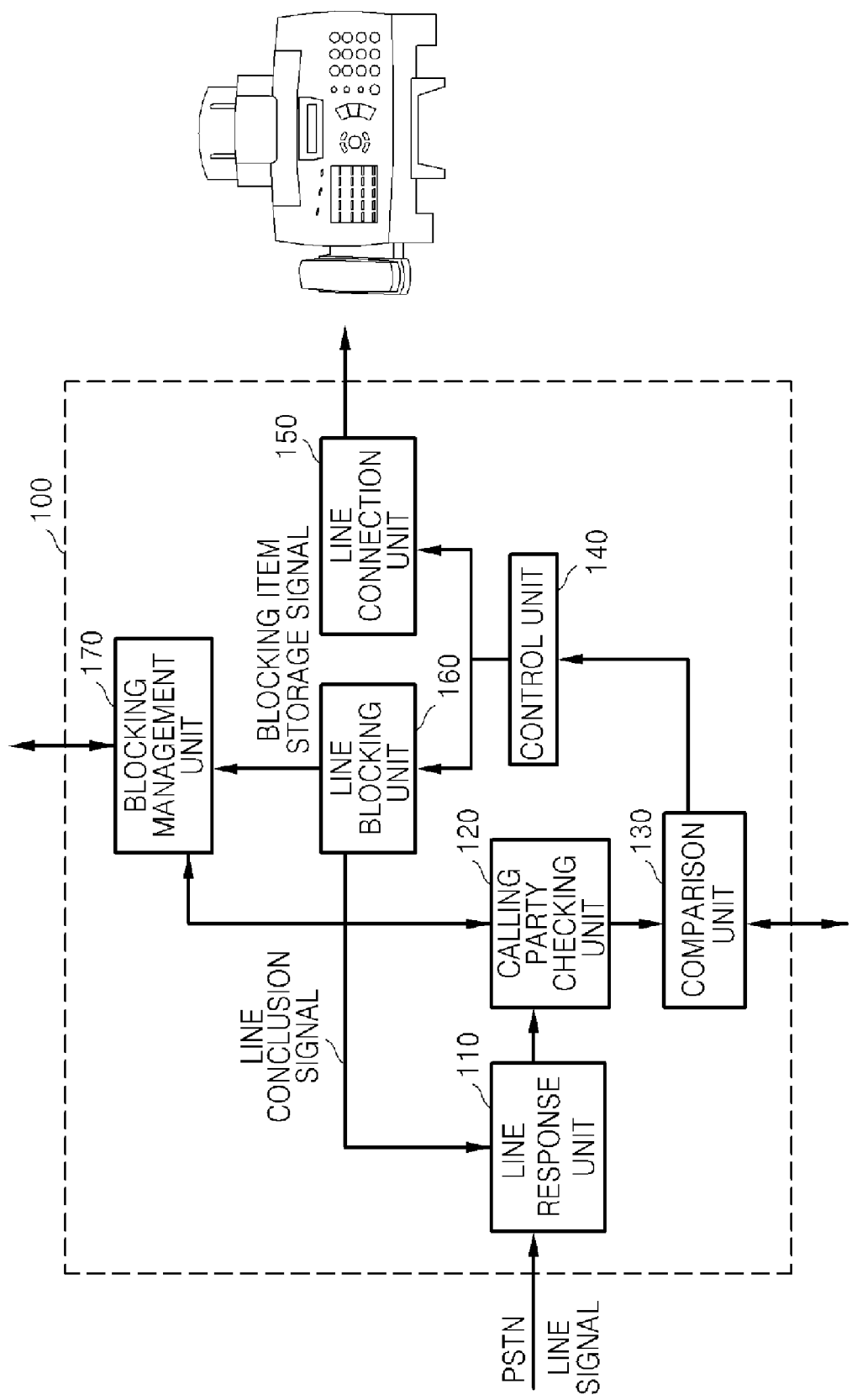
[Fig. 1]

[Fig. 2]
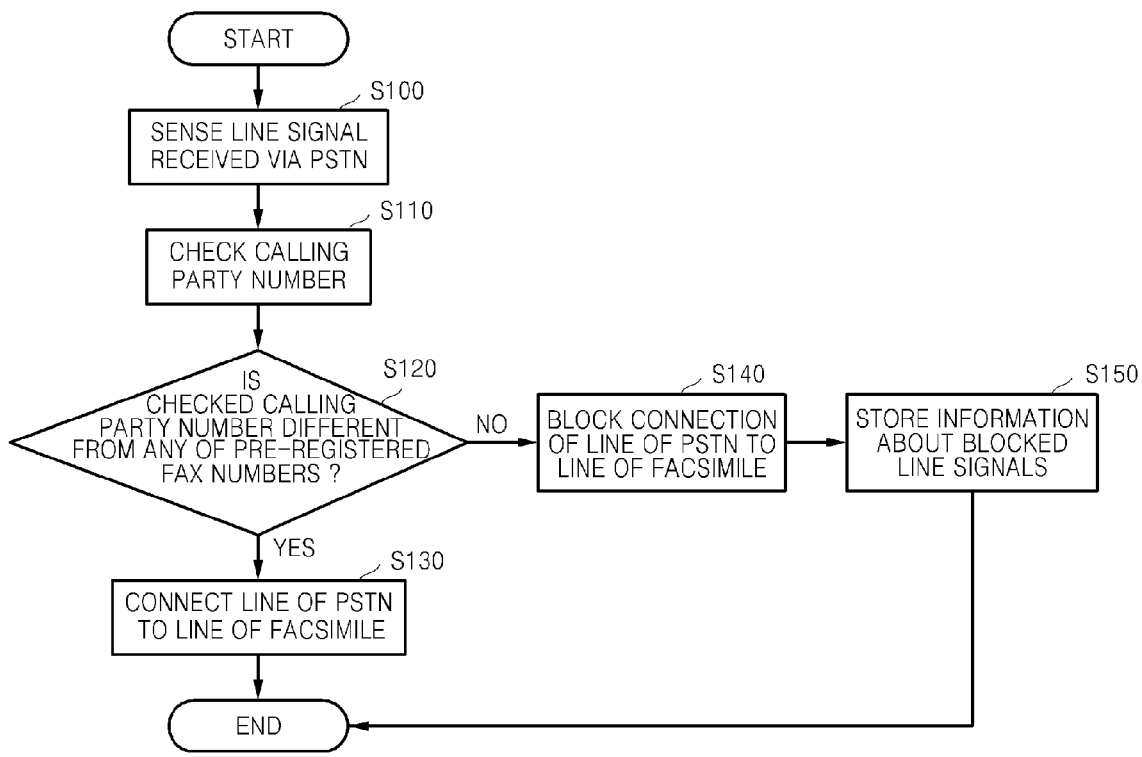

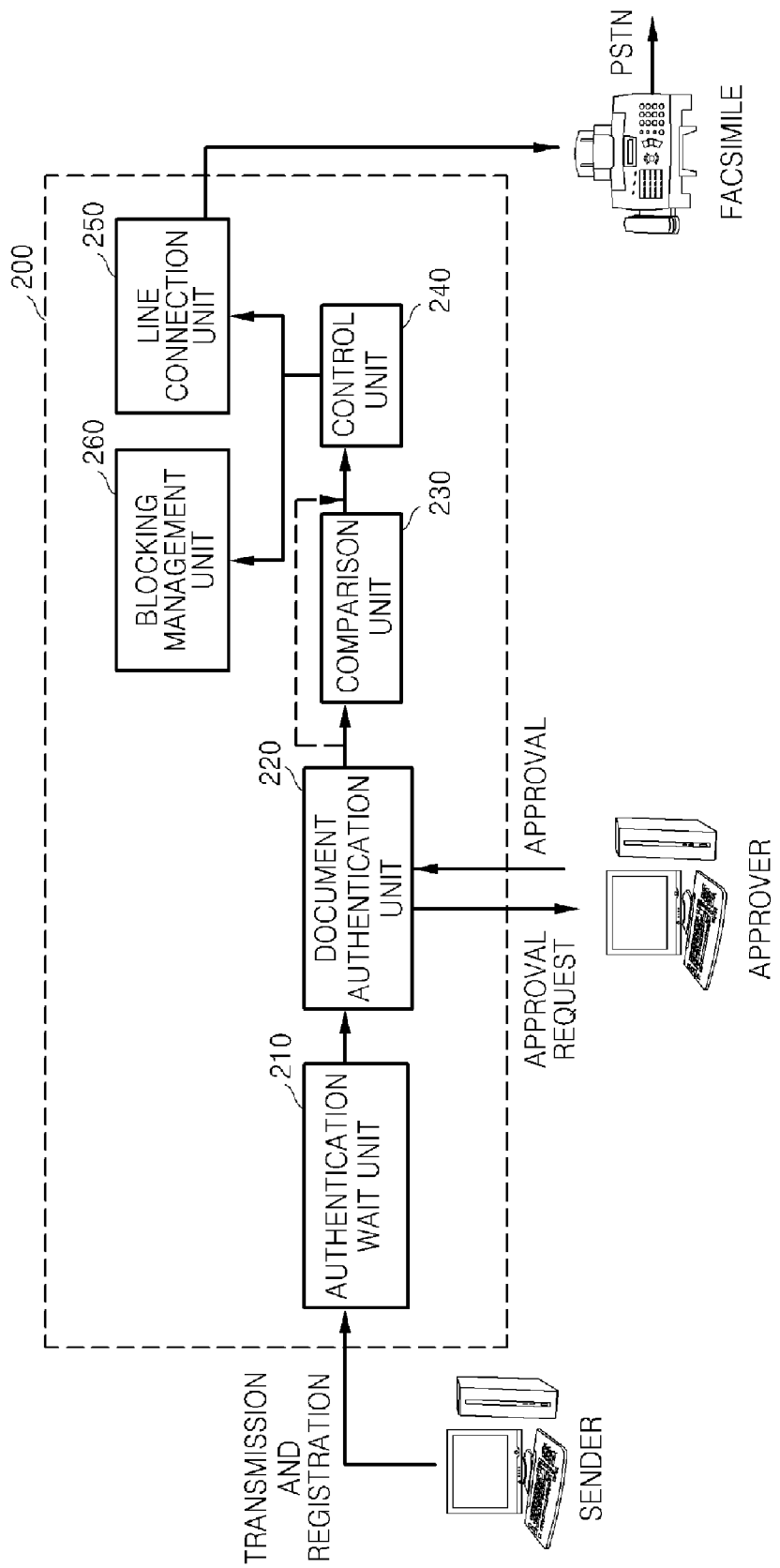
[Fig. 3]

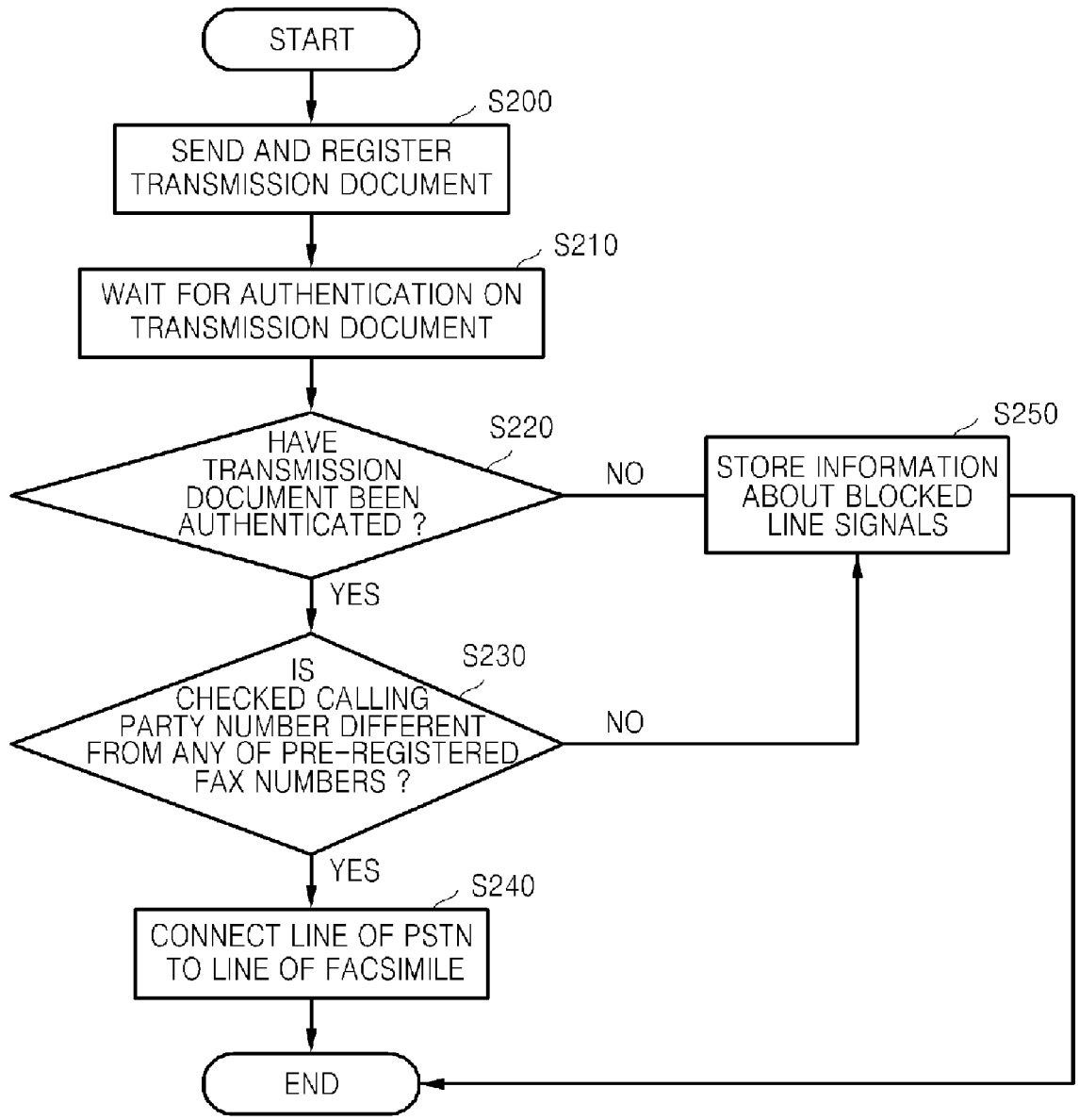
[Fig. 4]

[Fig. 5]
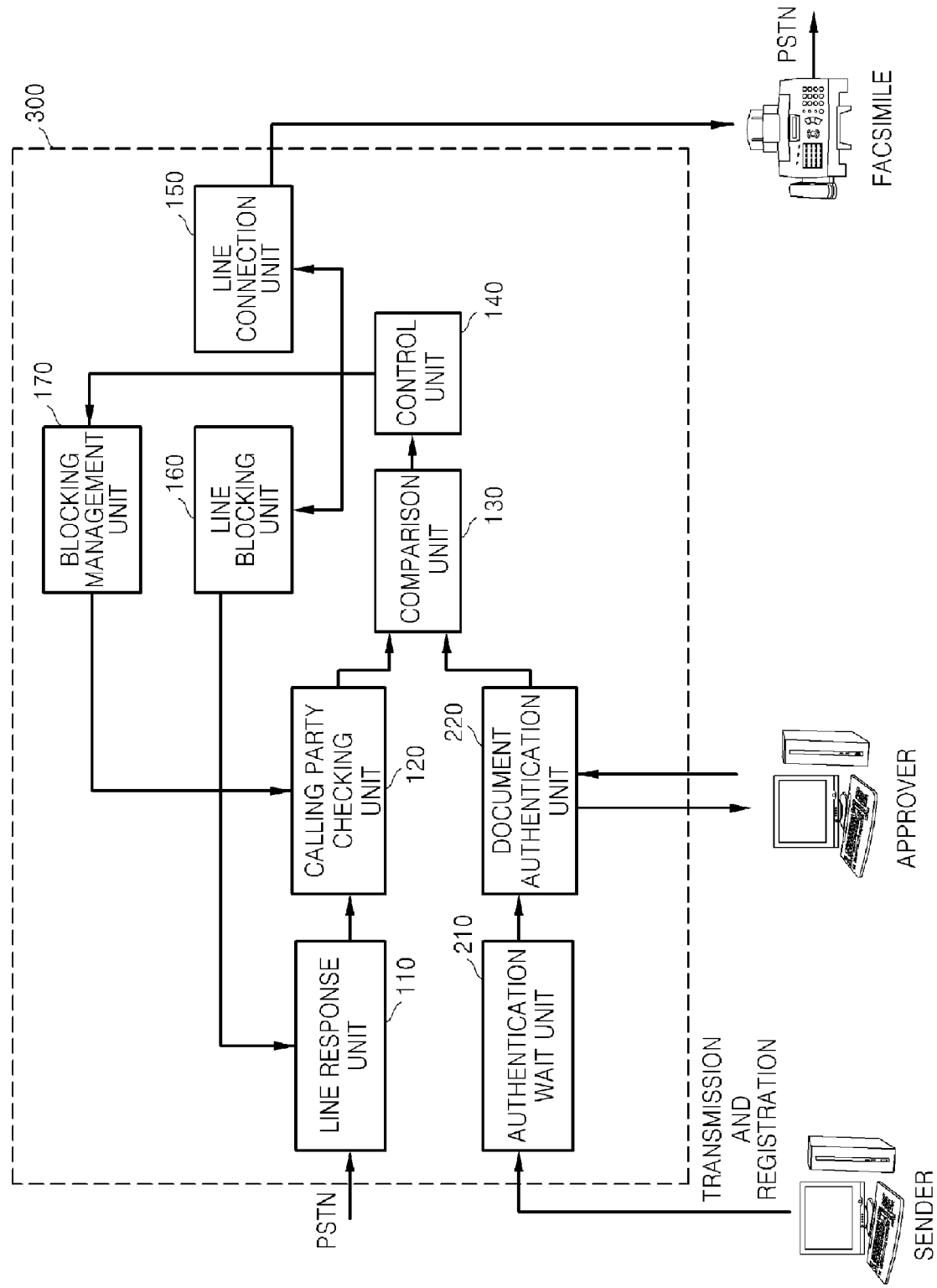

CONTROL DEVICE FOR CONTROLLING SECURE FAX MACHINE AND METHOD THEREOF

TECHNICAL FIELD

The present invention relates to a facsimile controlling device, and more particularly, to a facsimile controlling device for facsimile security that can provide strong security for a facsimile and a facsimile controlling method.

BACKGROUND ART

In general, facsimiles are connected to a public switched telephone network (PSTN) and can transmit and receive document data to and from other facsimiles connected to the PSTN and output the received document data.

Since facsimiles are connected to a PSTN, anybody can transmit fax data to the facsimiles if they know the fax numbers of the facsimiles. Accordingly, facsimiles may receive unnecessary data such as advertisements. In addition, the importance of information in a modern society increases, whereas a security device for data that is transmitted and received via facsimiles is weak.

There remains a demand for technology capable of reinforcing the security for a facsimile by filtering calling numbers and/or called numbers in transmission and reception of data via facsimiles and performing an authentication procedure on fax data for receiving an approval from an approver during transmission of the fax data.

In other words, if a facsimile has a function of blocking fax data from being transmitted with a specific called number, it can be considered that a security device for receiving places that receive the fax data is prepared to some degree. However, a special security device for the contents of fax data is needed. For example, if a company sets a transmission of fax data to rival companies to be blocked, the company is unable to transmit information about the company to the rival companies. However, as for confidential documents of the company, transmission thereof to every company via facsimiles need to be blocked. Therefore, a security device for the contents of fax data as well as for called numbers is needed.

DISCLOSURE OF INVENTION

Technical Problem

The present invention provides a device and method of blocking unnecessary fax data in advance before connecting signals output from specific calling party numbers to a facsimile.

The present invention also provides a device and method that allows fax data to be transmitted after allowing the contents of the fax data to be approved in advance by an approver. The present invention also provides a device and method of blocking the transmission of fax data to specific destination numbers.

Advantageous Effects

A facsimile controlling device for facsimile security according to the present invention can block unnecessary fax data in advance before connecting signals output from specific calling party numbers to a facsimile, thereby preventing paper from being wasted due to the output of the unnecessary fax data.

In addition, the facsimile controlling device for facsimile security according to the present invention provides security for the contents of fax data by allowing fax data to be transmitted after allowing the contents of the fax data to be approved in advance by an approver. Moreover, the facsimile controlling device for facsimile security according to the present invention provides security for fax-receiving places by previously registering fax numbers to be blocked from transmitting fax data.

BRIEF DESCRIPTION OF THE DRAWINGS

The above and other features and advantages of the present invention will become more apparent by describing in detail exemplary embodiments thereof with reference to the attached drawings in which:

FIG. 1 is a block diagram of a structure of a facsimile controlling device for facsimile security upon fax data reception according to an embodiment of the present invention;

FIG. 2 is a flowchart of an operation of the facsimile controlling device for facsimile security illustrated in FIG. 1 upon fax data reception;

FIG. 3 is a block diagram of a structure of a facsimile controlling device for facsimile security upon fax data transmission according to an embodiment of the present invention;

FIG. 4 is a flowchart of an operation of the facsimile controlling device for facsimile security illustrated in FIG. 3 upon fax data transmission; and FIG. 5 is a block diagram of an overall structure of a facsimile controlling device for facsimile security upon both fax data reception and fax data transmission according to an embodiment of the present invention.

BEST MODE FOR CARRYING OUT THE INVENTION

According to an aspect of the present invention, there is provided a facsimile controlling device for facsimile security comprising: a line response unit sensing a line signal received from an external source via a public switched telephone network (PSTN) and receiving fax data; a calling party checking unit checking a calling party number on the basis of the line signal sensed by the line response unit; a comparison unit comparing the calling party number checked by the calling party checking unit with pre-registered fax numbers; a control unit outputting a control signal for controlling whether to connect the line signal to a facsimile on the basis of a result of the comparison performed by the comparison unit; and a line connection unit connecting the line signal to the facsimile in response to the control signal output by the control unit.

The facsimile controlling device for facsimile security may further comprise a line blocking unit outputting a line conclusion signal to the line response unit for concluding the line signal in response to the control signal output from the control unit.

The facsimile controlling device for facsimile security may further comprise a blocking management unit storing information about the line signal that is blocked, wherein the blocking management unit may receive and store the information about the line signal that is blocked from the calling party checking unit in response to a blocking item storage signal output from the line blocking unit.

According to another aspect of the present invention, there is provided a facsimile controlling device for facsimile security comprising: an authentication wait unit receiving a transmission document, the transmission document including fax data to be transmitted and a destination number, and storing the transmission document so that the transmission document can undergo authentication later; a document authentication unit receiving the transmission document from the authentication wait unit and outputting a document authentication signal that represents whether the contents of the fax data included in the transmission document has been approved by an approver; a control unit outputting a control signal for controlling whether to transmit the transmission document on the basis of the document authentication signal output by the document authentication unit; and a line connection unit transmitting the transmission document to a facsimile in response to the control signal output by the control unit.

The document authentication unit may further output an approval requesting signal to a computer of the approver for requesting an approval of the received transmission document.

The facsimile controlling device for facsimile security may further comprise a comparison unit receiving the document authentication signal from the document authentication unit, comparing a calling party number with pre-registered fax numbers, and outputs a result of the comparison to the control unit.

The facsimile controlling device for facsimile security may further comprise a blocking management unit receiving the control signal from the control unit and storing information about a blocked transmission document.

According to another aspect of the present invention, there is provided a facsimile controlling device for facsimile security comprising: a line response unit sensing a line signal received from an external source via a public switched telephone network (PSTN) and receiving fax data; a calling party checking unit checking a calling party number on the basis of the line signal sensed by the line response unit; a comparison unit comparing the calling party number checked by the calling party checking unit with pre-registered fax numbers; a control unit outputting a control signal for controlling whether to connect the line signal to a facsimile on the basis of a result of the comparison performed by the comparison unit; a line connection unit connecting the line signal to the facsimile in response to the control signal output by the control unit; an authentication wait unit receiving a transmission document, the transmission document including fax data to be transmitted and a destination number, and storing the transmission document so that the transmission document can undergo authentication later; and a document authentication unit receiving the transmission document from the authentication wait unit and outputting a document authentication signal that represents whether the contents of the fax data included in the transmission document has been approved by an approver, wherein the control unit further outputs a control signal for controlling whether to transmit the transmission document on the basis of the document authentication signal output by the document authentication unit, and the line connection unit further transmits the transmission document to the facsimile in response to the control signal output by the control unit.

According to another aspect of the present invention, there is provided a facsimile controlling method for facsimile security performed by a facsimile controlling device for facsimile security, the method comprising: sensing a line signal received from an external source via a public switched telephone network (PSTN) and receiving fax data; checking a calling party number on the basis of the sensed line signal; comparing the checked calling party number with pre-registered fax numbers; controlling whether to connect the line signal to a facsimile on the basis of a result of the comparison; and connecting the line signal to the facsimile in response to a result of the control.

According to another aspect of the present invention, there is provided a facsimile controlling method for facsimile security performed by a facsimile controlling device for facsimile security, the method comprising: receiving a transmission document, the transmission document including fax data to be transmitted via a public switched telephone network (PSTN) and a destination number, and storing the transmission document so that the transmission document can undergo authentication later; outputting a document authentication signal that represents whether the contents of the fax data included in the transmission document has been approved by an approver; controlling whether to transmit the transmission document on the basis of the document authentication signal; and transmitting the transmission document to a facsimile in response to a result of the control.

The facsimile controlling method for facsimile security may further comprise comparing a calling party number with pre-registered fax numbers, wherein in the controlling operation, the transmission document is either blocked or transmitted to the facsimile according to the document authentication signal and a result of the comparison.

MODE FOR THE INVENTION

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. Like reference numerals in the drawings denote like elements.

FIG. 1 is a block diagram of a structure of a facsimile controlling device 100 for facsimile security upon fax data reception according to an embodiment of the present invention. Referring to FIG. 1, the facsimile controlling device 100 for facsimile security includes a line response unit 110, a calling party checking unit 120, a comparison unit 130, a control unit 140, and a line connection unit 150. The facsimile controlling device 100 for facsimile security may further include a line blocking unit 160 and a blocking management unit 170.

The line response unit 110 senses a line signal received from an external source via a public switched telephone network (PSTN) and receives fax data. The line response unit 110 also concludes (or terminates) the line signal in response to a line conclusion signal received from the line blocking unit 160. In other words, the line response unit 110 blocks a call made by the external source via the PSTN, in response to the line conclusion signal. The conclusion of the line signal is performed by the line response unit 110, but the present invention is not limited thereto. In other words, the line blocking unit 160 may conclude the line signal. The line signal denotes a ring tone that is received via the PSTN.

The calling party checking unit 120 checks a calling party number on the basis of the line signal sensed by the line response unit 110. The comparison unit 130 compares the calling party number checked by the calling party checking unit 120 with pre-registered fax numbers. The comparison unit 130 may include a predetermined memory device (not shown) in order to register at least one fax number to be blocked, and may be connected to a predetermined user interface (not shown) in order to delete the at least one fax number registered in the memory device or to input a new fax number.

The fax number registered in the predetermined memory device may be a fax number that is to be blocked or a fax number that can be received.

The control unit 140 outputs a control signal for controlling whether to connect the line signal to a facsimile or block the line signal according to a result of the comparison performed by the comparison unit 130. In other words, when the calling party number is the same as one of the pre-registered fax numbers to be blocked, the control unit 140 controls a line to be blocked. On the other hand, when the calling party number is different from any of the pre-registered fax numbers to be blocked, the control unit 140 controls the line to be connected to the facsimile so that the facsimile outputs the fax data received via the line signal.

The line connection unit 150 receives the control signal from the control unit 140 and connects the line signal to the facsimile in response to the control signal. In other words, when a fax is received from a number other than a number to be blocked, the facsimile controlling device 100 only serves as a passage between an external telephone connection port and a facsimile as the facsimile is directly connected to a PSTN.

The facsimile controlling device 100 for facsimile security may further include the line blocking unit 160, which receives the control signal from the control unit 140 and outputs the line conclusion signal for concluding the line signal to the line response unit 110 in response to the control signal. In other words, when a fax is received from a pre-registered number to be blocked, the line blocking unit 160 blocks a dialed call. In this case, the line blocking unit 160 may output the line conclusion signal either to the PSTN via the line response unit 110 or directly to the PSTN.

The facsimile controlling device 100 for facsimile security may further include the blocking management unit 170, which stores information about line signals that are to be blocked. More specifically, the blocking management unit 170 receives a blocking item storage signal from the line blocking unit 160 and receives and stores information about the to-be-blocked line signals from the calling party checking unit 120 in response to the blocking item storage signal. A place from which the blocking management unit 170 receives the blocking item storage signal may vary according to cases. In other words, the blocking management unit 170 may receive the blocking item storage signal from the control unit 140 or the comparison unit 130.

Examples of the information about the to-be-blocked line signals may include calling numbers of the line signals to be blocked, the time required to receive the line signals to be blocked, etc. In addition, the blocking management unit 170 may be connected to a predetermined display device (not shown) so that a user can check the contents stored in the blocking management unit 170 and may also be connected to a predetermined interface (not shown) so that the user can delete the checked contents.

FIG. 2 is a flowchart of an operation of the facsimile controlling device 100 for facsimile security illustrated in FIG. 1 upon fax data reception.

Referring to FIGS. 1 and 2, in operation S100, the line response unit 110 of the facsimile controlling device 100 senses the line signal received via the PSTN. In operation S110, the calling party checking unit 120 checks a calling party number on the basis of the line signal. In operation S120, the comparison unit 130 compares the checked calling party number with pre-registered fax numbers. The control unit 140 controls whether to connect or block a line of the PSTN on the basis of a result of the comparison. In response to the control performed by the control unit 140, the line connection unit 150 connects the line of the PSTN to the line of the facsimile in operation S130, or the line blocking unit 160 blocks the line of the PSTN in operation S140. In operation S150, the blocking management unit 170 stores information about blocked line signals.

FIG. 3 is a block diagram of a structure of a facsimile controlling device 200 for facsimile security upon fax data transmission according to an embodiment of the present invention. Referring to FIG. 3, the facsimile controlling device 200 for facsimile security includes an authentication wait unit 210, a document authentication unit 220, a control unit 240, and a line connection unit 250. The facsimile controlling device 200 for facsimile security may further include a comparison unit 230 and a blocking management unit 260.

The authentication wait unit 210 receives a transmission document including fax data to be transmitted and a destination number and stores the transmission document so that it can undergo a document authentication procedure later.

For example, when the facsimile controlling device 200 for facsimile security is included in a computer capable of sending and receiving a fax or in between a computer capable of sending and receiving a fax and a facsimile, the authentication wait unit 210 receives a transmission document from a sender computer. On the other hand, when the facsimile controlling device 200 for facsimile security is connected to a facsimile in the form of a terminal, the authentication wait unit 210 may receive a transmission document from the facsimile in which a scanner is installed.

The document authentication unit 220 receives the transmission document from the authentication wait unit 210 and outputs a document authentication signal that indicates whether the transmission document has been authenticated by an approver on the basis of the contents of the fax data included in the transmission document. In other words, the document authentication unit 220 outputs a signal that represents whether the contents of the transmission document are allowed to be transmitted to the outside.

The document authentication unit 220 may further output an approval requesting signal to a computer of the approver to request an approval of the received transmission document. In other words, the document authentication unit 220 may output the approval requesting signal to the approver's computer in order to output the signal representing whether the contents of the transmission document are allowed to be transmitted to the outside. When the document authentication unit 220 receives an approval signal from the approver's computer, it outputs to the control unit 240 the document authentication signal that indicates whether the transmission document has been authenticated.

In order to receive the approval signal, the document authentication unit 220 may undergo several stages of approval procedures. In this case, in order to output the document authentication signal to the control unit 240, the document authentication unit 220 may have to receive an approval signal that includes an approval of a final approver. In other words, a computer (i.e., an approver) to which the document authentication unit 220 outputs the approval requesting signal may be different from a computer (i.e., an approver) that outputs the approval signal to the document authentication unit 220.

In addition, instead of receiving the transmission document from the authentication wait unit 210, the document authentication unit 220 may receive a predetermined signal from the authentication wait unit 210 that indicates a receipt of the transmission document and output the approval requesting signal to the approver's computer in response to the predetermined signal. In this case, the authentication wait unit 210 preferably outputs information about the transmission document to the approver's computer.

The control unit 240 outputs a control signal for controlling whether to transmit the transmission document on the basis of the document authentication signal output by the document authentication unit 220. In other words, when the control unit 240 receives a document authentication signal that represents a refusal of document authentication from the document authentication unit 220, the control unit 240 outputs a corresponding control signal to the blocking management unit 260. On the other hand, when the control unit 240 receives a document authentication signal that represents a permission of document authentication from the document authentication unit 220, the control unit 240 outputs a corresponding control signal to the line connection unit 250.

The line connection unit 250 transmits the transmission document to the facsimile in response to the control signal output from the control unit 240. The facsimile transmits the received transmission document to a facsimile (not shown) corresponding to the destination number via a PSTN.

Instead of transmitting the transmission document to the facsimile corresponding to the destination number via the PSTN, the line connection unit 250 may output only a predetermined connection signal to the facsimile corresponding to the destination number, and the authentication wait signal 210 instead of the line connection unit 250 may transmit the transmission document to the facsimile corresponding to the destination number. The facsimile controlling device 200 for facsimile security may further include the comparison unit 230, which receives the document authentication signal from the document authentication unit 220, compares a calling number with pre-registered fax numbers, and outputs a result of the comparison to the control unit 240.

The comparison unit 230 compares the destination number included in the transmission document with the pre-registered fax numbers. The comparison unit 230 may include a predetermined memory device (not shown) in order to register at least one fax number that is to be blocked, and may be connected to a predetermined user interface (not shown) in order to delete the at least one fax number registered in the predetermined memory device or to input a new fax number. The fax number registered in the memory device may be a fax number that is to be blocked or a fax number that can be received.

The comparison unit 230 may be included between the authentication wait unit 210 and the document authentication unit 220. In other words, the comparison unit 230 is not necessarily installed between the document authentication unit 220 and the control unit 240.

When the facsimile controlling device 200 for facsimile security includes the comparison unit 230, the transmission document must pass a document authentication procedure in the document authentication unit 220 and not be blocked by the comparison unit 230 in order to be actually transmitted to the facsimile.

The facsimile controlling device 200 for facsimile security may further include the blocking management unit 260, which receives the control signal from the control unit 240 and stores information about a blocked transmission document. The blocking management unit 260 may store how the transmission document is blocked (e.g., a refusal of an approval by an approver or an attempt for transmission to a blocked fax number), the time required for a transmission attempt, fax data included in the transmission document, and other things.

FIG. 4 is a flowchart of an operation of the facsimile controlling device 200 for facsimile security illustrated in FIG. 3 upon fax data transmission.

Referring to FIGS. 3 and 4, in operation S210, the authentication wait unit 210 receives a transmission document that has been transmitted and registered by a sender computer or a facsimile in operation S200, and stores the transmission document so that the transmission document can undergo authentication later. In operation S220, the document authentication unit 220 outputs the document authentication signal to either the comparison unit 230 or the control unit 240 according to whether the approval signal output from the approver's computer. In operation S230, the comparison unit 230 compares the destination number included in the transmission document with the pre-registered fax numbers. The control unit 240 controls whether to transmit the transmission document, on the basis of the document authentication signal of the document authentication unit 220 and a result of the comparison performed by the comparison unit 230. In response to a control signal that is output on the basis of a result of the control made by the control unit 240, the line connection unit 250 connects a line to the facsimile in order to transmit the transmission document in operation S240, or the blocking management unit 260 stores information about the blocked transmission document in operation S250.

FIG. 5 is a block diagram of an overall structure of a facsimile controlling device 300 for facsimile security upon both fax data reception and fax data transmission according to an embodiment of the present invention. Function blocks of the facsimile controlling device 300 for facsimile security are the same as or similar to those of the facsimile controlling devices 100 and 200 for facsimile security, so a detailed description thereof is omitted.

The facsimile controlling device 300 for facsimile security may be connected between a PSTN port and a facsimile. Alternatively, the facsimile controlling device 300 for facsimile security may be included in a facsimile or in a computer capable of transmitting and receiving data to and from a facsimile.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

A facsimile controlling device for facsimile security according to the present invention can be used in a PSTN, a facsimile, or a computer that can transmit and receive fax data.

The invention claimed is:

1. A fax server comprising:
   a transmission/reception module transmitting and receiving first fax data to and from an external source via an Internet;
   a storage module storing the first fax data from the transmission/reception module;
   a filtering module receiving the first fax data from the storage module and outputting one of a reception refusal signal and a reception approval signal both for the first fax data to the storage module on the basis of a caller number included in the first fax data;
   an authentication module receiving second fax data from a second user computer to be output to the outside and transmitting the second fax data to the computer of an approver and the storage module in order to authenticate the content of the received second fax data;
   wherein the storage module has received the reception approval signal for the first fax data, the storage module transmits the first fax data received via the transmission/reception module to the second user computer in response to a fax request signal output from the second user computer;
   the authentication module may be configured to receive an authentication signal from the approver via the approver's computer and transmits the authentication signal to the storage module;
   the filtering module may be configured to receive the second fax data from the storage module and outputs one of a send refusal signal and a send approval signal both for the second fax data to the storage module on the basis of a destination number included in the received second fax data; and
   when the storage module has received the authentication signal and the send approval signal both for the second fax data, the storage module transmits the stored second fax data to the outside via the internet.

2. The fax server of claim 1, wherein
   the filtering module comprises a fax number storage unit which stores reception-refused fax numbers or reception-approved fax numbers in order to output one of the reception refusal signal and the reception approval signal; and
   the fax number storage unit receives the reception-refused fax numbers or reception-approved fax numbers from approved computer.

3. A method of providing a fax system, the method comprising:
   a fax data transmission controller receiving transmission fax data from a facsimile;
   the fax data transmission controller storing the received transmission fax data;
   the fax data transmission controller transmitting the stored transmission fax data to a fax server via an internet;
   the fax data transmission controller receiving a transmission approval signal for the transmission fax data from the fax server; and
   the fax data transmission controller transmitting the stored transmission fax data to an external source via a PSTN in response to the received transmission approval signal;
   the fax server transmitting the transmission fax data to the computer of an approver in order to perform authentication on the content of the stored transmission fax data;
   the fax server receiving an authentication signal from the approver via the approver's computer; and
   when the content of the transmission fax data is authenticated, the fax server transmits the transmission approval signal to the fax data transmission controller.

4. A method of providing a fax system, the method comprising:
   a fax data transmission controller receiving transmission fax data from a first user computer;
   the fax data transmission controller storing the received transmission fax data to a fax server via an Internet;
   the fax data transmission controller receiving a transmission approval signal for the transmission fax data from the fax server; and
   the fax data transmission controller transmitting the stored transmission fax data to an external source via a PSTN in response to the received transmission approval signal;
   the fax server transmitting the transmission fax data to the computer of an approver in order to perform authentication on the content of the stored transmission fax data;
   the fax server receiving an authentication signal from the approver via the approver's computer; and
   when the content of the transmission fax data is authenticated, the fax server transmits the transmission approval signal to the fax data transmission controller.

5. A method of providing a fax system, the method comprising:
   a fax server receiving transmission fax data to be transmitted to the outside from a second user computer;
   the fax server storing the received transmission fax data;
   the fax server transmitting the transmission fax data to the computer of an approver in order to perform authentication on the content of the stored transmission fax data;
   the fax server receives an authentication signal from the approver via the approver's computer; and
   the fax server transmits the transmission fax data to a fax data transmission controller via an Internet in response to the authentication signal.

6. The method of claim 5, further comprising the fax server determining on the basis to a destination number included in the stored transmission fax data whether the transmission fax data is refused or allowed to be sent,
   wherein the fax server transmits the transmission fax data to the fax data transmission controller via the Internet when the content of the transmission fax data is authenticated and the transmission fax data is allowed to be sent.

7. The method of claim 6, further comprising the fax data transmission controller transmitting the transmission fax data received from the fax server to the outside via a PSTN.

8. A non-transitory recording medium having recorded thereon a program for the method of claim 3.

* * * * *